June 29, 1954     A. B. MANUPELLO     2,682,298
TIRE BEAD LOOSENING HAND TOOL
Filed Oct. 22, 1951     2 Sheets-Sheet 1
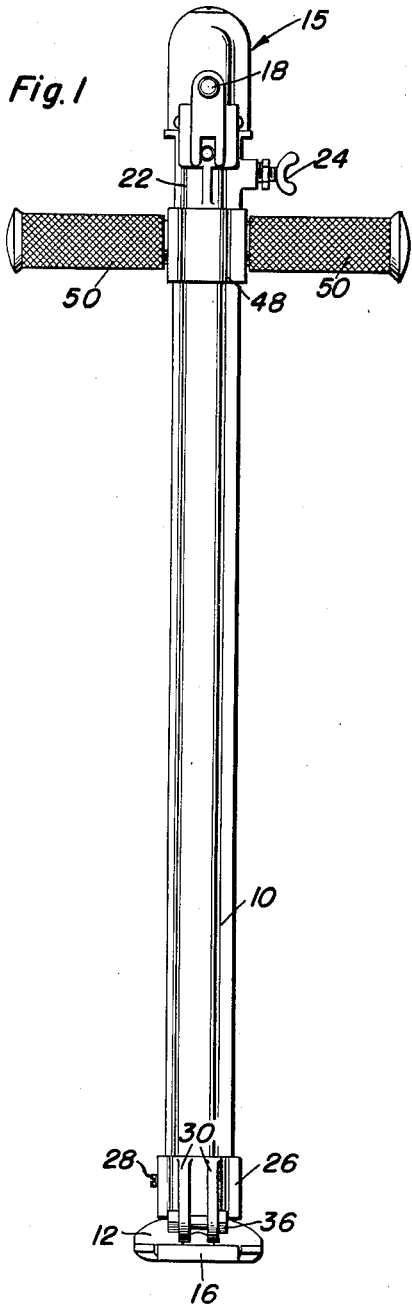
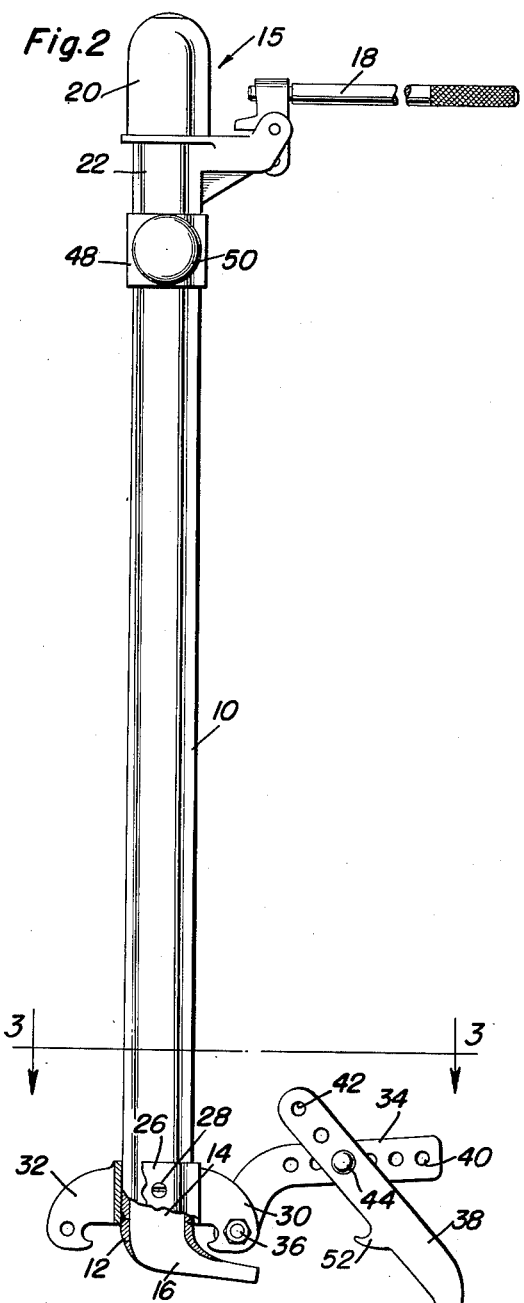
Anthony B. Manupello
INVENTOR.
BY *Clarence A. O'Brien and Harvey B. Jackson*
Attorneys June 29, 1954  A. B. MANUPELLO  2,682,298
TIRE BEAD LOOSENING HAND TOOL
Filed Oct. 22, 1951  2 Sheets-Sheet 2
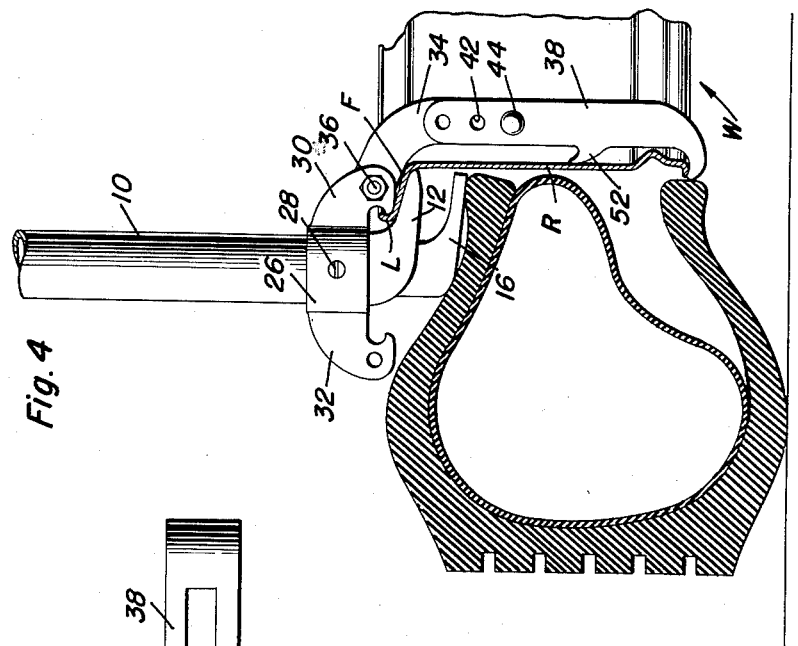
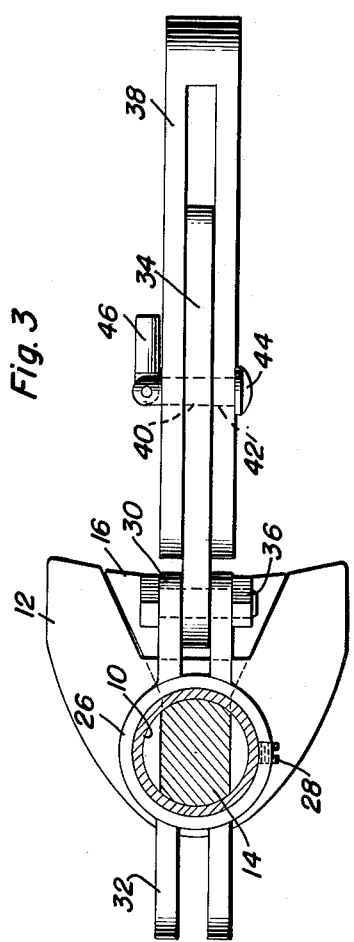
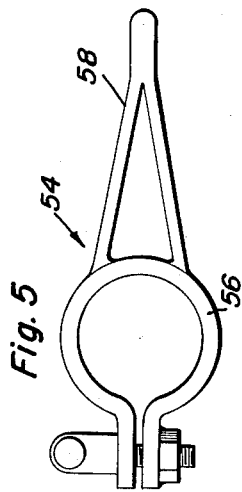
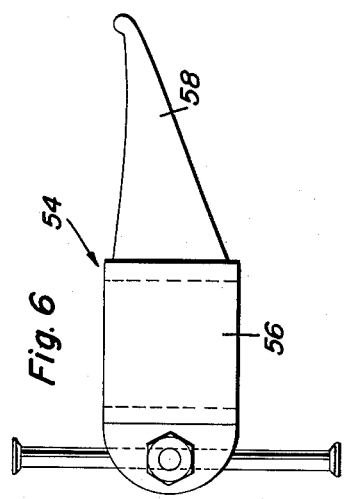
Anthony B. Manupello
INVENTOR.

Patented June 29, 1954

2,682,298

UNITED STATES PATENT OFFICE 2,682,298

TIRE BEAD LOOSENING HAND TOOL

Anthony B. Manupello, Pennsville, N. J., assignor to James Johnson and Rose Johnson, Lower Penns Neck Township, Salem County, N. J.

Application October 22, 1951, Serial No. 252,505

3 Claims. (Cl. 157—1.26)

This invention relates to new and useful improvements in devices for removing tires from rims and the primary object of the present invention is to provide a hydraulically actuated ram rod for forcing a tire from its holding rim in a convenient manner.

Another important object of the present invention is to provide a tire demounter including a hydraulically actuated ram rod slidably carried by a guide tube and novel and improved means for quickly and readily attaching the tube to or removing the tube from the rim of a vehicle wheel.

A further object of the present invention is to provide a device of the aforementioned character involving an adjustable clamping means, whereby the device may be employed in conjunction with rims of various widths.

A still further aim of the present invention is to provide a tire demounter that is simple and practical in construction, strong and reliable in use, small and compact in structure, efficient and durable in operation, inexpensive to manufacture, and otherwise well adapted for the purposes for which the same is intended.

Other objects and advantages reside in the details of construction and operation as more fully hereinafter described and claimed, references being had to the accompanying drawings forming part hereof, wherein like numerals refer to like parts throughout, and in which:

Figure 1 is a front elevational view of the present invention;

Figure 2 is a side view of Figure 1;

Figure 3 is an enlarged transverse horizontal sectional view taken substantially on the plane of section line 3—3 of Figure 2;

Figure 4 is a sectional view of a vehicle wheel and showing the present invention applied to the rim and forcing the tire from the rim;

Figure 5 is a plan view of the lifting hook used in the present invention; and,

Figure 6 is a side view of Figure 5.

Referring now to the drawings in detail, wherein for the purpose of illustration, there is disclosed a preferred embodiment of the present invention, the numeral 10 represents a tubular shaft or casing having a bifurcated gripping foot 12 at its lower end that is fixedly secured to or integrally formed with the shaft.

A ram rod 14 is slidably received in the shaft 10 and its lower end is formed with a laterally projecting pressure foot 16 that underlies the gripping foot 12. The rod 14 is adjusted longitudinally within the shaft 10 by a hyraulic means 15 including a manually actuated lever 18, an oil dome 20 and a casing 22 supported on the upper end of the shaft 10 and holding the dome 20. The hydraulic means 15 may be of any suitable type, whereby a manually reciprocation of the lever 18 will force fluid into the shaft 10 in order to move the rod 14 and the pressure foot 16 away from the gripping foot 12.

The casing is provided with a bore that communicates with the interior of shaft 10 and the casing supports a manually actuated valve 24, whereby the rod 14 may be retracted. Obviously any suitable hydraulic means may be employed for moving the rod 14 longitudinally within shaft 10.

A collar 26 embraces the lower end of the shaft 10 and is held thereon by a set screw 28. A pair of hook members 30 and 32 are fixed to and project radially outwardly from diametrically opposite sides of the collar 26. The hook members 30 and 32 are bifurcated and a link 34 is pivotally secured between the furcations of one of the hook members by a combined pivot and fastener 36.

Link 34 extends between the furcation of a second bifurcated hook member 38 and is formed with a plurality of longitudinally spaced apertures 40 for selectively registering with longitudinally spaced apertures 42 in the furcations of hook member 38. A pin 44 is extended through an aperture in the link and registering apertures in the hook member 38 to adjust the hook member 38 relative to the link. A pivotal latch 46 carried by the pin 44 prevents accidental retraction of the pin 44.

An upper collar 48 is suitably secured about the upper end of shaft 10 and supports a pair of laterally projecting coaxial hand grips 50 having knurled outer surfaces.

In practical use of the present invention, the lock ring (not shown) of a rim R is first removed and the wheel W is turned over, rim flange F upward. The demounter is placed in a horizontal position with foot 16 raised against foot 12. Hook member 38 is engaged with the rim on the side of the rim from which the ring was removed. Then the holes 40 and 42 are matched up and the pin 44 inserted.

The demounter is raised by hand grip 50 until shaft 10 is in a vertical position. Hook 30 engages the rim lip L and foot 12 engages under flange F.

Lever 18 is then reciprocated to move foot 16 downwardly forcing the tire T from the rim R, as shown in Figure 4. The demounter is next moved circumferentially and the previous operations repeated.

For use with small rims, the hook member 38 is formed with spurs 52 on its furcations that function similar to hook member 38.

A bumper engaging member 54 may be used with the hydraulic ram to be clamped on the shaft 10. This member comprises a split clamp 56 having a radially projecting V-shaped element 58 fixed thereto that will engage a bumper to lift the bumper as foot 16 rests against the ground with rod 14 and shaft 10 adjusted longitudinally of each other.

Having described the invention, what is claimed as new is:

1. A tire demounter comprising a hollow shaft having a gripping foot at one end for engaging under the flange of a tire rim, a slidable rod received in the shank and having a pressure foot at one end, means connected to the rod for moving the rod longitudinally of the shaft, and clamping means on the shaft for engaging the rim of a vehicle wheel and coacting with the gripping foot to support the demounter on a rim as the rod is actuated to force a tire from the rim, said clamping means comprising a first hook member supported on the shaft, a link pivoted to the first hook member, a second hook member having a plurality of longitudinally spaced apertures, said link having an aperture for selectively registering with the apertures in said second hook member, and a pin extendable through registering apertures in said link and second hook member.

2. As a new article of manufacture, an attachment for pneumatic tire bead loosening tools, said attachment comprising a clamp sleeve, a downwardly facing rigid hook element fixed to said clamp sleeve, a link pivotally attached to said hook element, a second hook element having an elongated shank portion, and means adjustably pivotally attaching said link to said shank portion.

3. As a new article of manufacture, an attachment for pneumatic tire bead loosening tools, said attachment comprising a clamp sleeve, a downwardly facing rigid hook element fixed to said clamp sleeve, a link pivotally attached to said hook element, a second hook element having an elongated shank portion, and means adjustably pivotally attaching said link to said shank portion, and a spacer spur on said shank portion extending toward said clamp and having an outer extremity, said second hook element having an outer extremity projecting outwardly beyond the outer extremity of said spur to engage an edge of a tire rim engaged by said spur.

References Cited in the file of this patent

UNITED STATES PATENTS

| Number | Name | Date |
|---|---|---|
| 1,043,424 | Hevey | Nov. 5, 1912 |
| 1,475,519 | Snider | Nov. 27, 1923 |
| 1,519,558 | Snider | Dec. 16, 1924 |
| 2,495,117 | McCollister | Jan. 17, 1950 |
| 2,513,707 | Barnett | July 4, 1950 |
| 2,520,330 | Northrup et al. | Aug. 29, 1950 |
| 2,573,233 | Verdick et al. | Oct. 30, 1951 |
| 2,581,086 | Edenfield et al. | Jan. 1, 1952 |
| 2,606,602 | Manupello | Aug. 12, 1952 |
| 2,621,715 | Lien et al. | Dec. 16, 1952 |